(12) United States Patent
Kang et al.

(10) Patent No.: US 10,589,712 B2
(45) Date of Patent: Mar. 17, 2020

(54) VEHICLE SEAT HARNESS RETAINER (71) Applicant: Munchkin, Inc., Van Nuys, CA (US)

(72) Inventors: Yong Sun Simon Kang, Pasadena, CA (US); Mark Gerard Tebbe, Ventura, CA (US); Thomas E. Birkert, West Hills, CA (US)

(73) Assignee: Munchkin, Inc., Van Nuys, CA (US)

( * ) Notice: Subject to any disclaimer, the term of this patent is extended or adjusted under 35 U.S.C. 154(b) by 107 days.

(21) Appl. No.: 15/904,309

(22) Filed: Feb. 23, 2018

(65) Prior Publication Data
US 2018/0236968 A1 Aug. 23, 2018

Related U.S. Application Data (60) Provisional application No. 62/462,761, filed on Feb. 23, 2017.

(51) Int. Cl.
*B60R 22/30* (2006.01)
*A44B 9/12* (2006.01)
*B60N 2/28* (2006.01)
*B60R 22/02* (2006.01)

(52) U.S. Cl.
CPC ............... *B60R 22/30* (2013.01); *A44B 9/12* (2013.01); *B60N 2/2812* (2013.01); *A44D 2203/00* (2013.01); *B60N 2002/2815* (2013.01); *B60R 2022/021* (2013.01)

(58) Field of Classification Search
CPC ........... Y10T 24/32; B60R 22/30; A44B 9/12; A44D 2203/00; B60N 2/2812
See application file for complete search history.

(56) References Cited

U.S. PATENT DOCUMENTS

| | | | | |
|---|---|---|---|---|
| 3,639,949 A | * | 2/1972 | Beck | A41D 25/022 24/66.11 |
| 9,814,283 B1 | * | 11/2017 | Nemecek | A44C 1/00 |
| 2014/0082894 A1 | * | 3/2014 | Walker | B60N 2/2812 24/303 |
| 2016/0113381 A1 | * | 4/2016 | Tsai | A44B 15/00 24/303 |

* cited by examiner

*Primary Examiner* — Robert Sandy
(74) *Attorney, Agent, or Firm* — Robert Z. Evora, Esq.

(57) ABSTRACT

A harness retainer having a cover, a magnet, a rear plate and a fastener. The cover has a ledge defining a flat surface. The rear plate is attached to the cover and is constructed to define a contour having a radius of curvature. The magnet is disposed between the cover and the rear plate and is disposed under the ledge. The rear plate has a first retainer and a second retainer. The fastener is fixedly attached to the first retainer and removably attached to the second retainer.

19 Claims, 7 Drawing Sheets

VEHICLE SEAT HARNESS RETAINER

CROSS REFERENCE TO RELATED APPLICATIONS

This application claims priority to U.S. Provisional Patent Application Ser. No. 62/462,761, filed Feb. 23, 2017; the content of which is hereby incorporated by reference herein in its entirety into this disclosure.

TECHNICAL FIELD

The subject disclosure relates generally to a vehicle seat harness retainer. More particularly, to an infant car seat strap holder.

BACKGROUND

Placing a child into a car seat can be a cumbersome task. All too often, when the infant is placed into the seat, the straps attached to the car seat that harness the child to the car seat are hard to reach, hard to hold, or positioned behind the seated infant, making it difficult to secure the child in the seat. This results in additional time needed to find the strap and buckle the child into the seat. During this time, the child may become impatient or uncomfortable. Further, such action may be in a crowded parking lot or under inclement weather, which makes the prolonged duration of the process uncomfortable for both parent and child.

SUMMARY OF THE SUBJECT DISCLOSURE

The present subject disclosure presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. The sole purpose of the subject summary is to present some concepts in a simplified form as a prelude to the more detailed description that is presented hereinafter.

In one exemplary embodiment, the present subject disclosure is a harness retainer. The harness retainer includes a cover having a ledge defining a flat surface; a magnet; a rear plate attached to the cover defining a contour having a radius of curvature, wherein the magnet is disposed under the ledge; the rear plate having a first retainer and a second retainer; and a fastener fixedly attached to the first retainer and removably attached to the second retainer.

In another exemplary embodiment, the present subject disclosure is a harness retainer. The harness retainer includes a curved cover having a ledge defining a flat surface; a magnet; a curved rear plate attached to the cover defining a contour having a radius of curvature, wherein the magnet is disposed under the ledge; the rear plate having a first retainer and a second retainer; and a fastener fixedly attached to the first retainer and removably attached to the second retainer.

In yet another exemplary embodiment, the present subject disclosure is harness retainer. The harness retainer includes a cover having a ledge defining a flat surface; a magnet; a rear plate attached to the cover, wherein the magnet is disposed under the ledge; the rear plate having a first retainer and a second retainer; a fastener fixedly attached to the first retainer and removably attached to the second retainer; and a release button to release the fastener, having a spring which biases the release button in a position to block a slit and allow the release button to be depressed into a cavity in the rear plate.

While various aspects, features, or advantages of the subject disclosure are illustrated in reference vehicle seat harness retainers, such aspects and features also can be exploited in various other configurations.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present subject disclosure will now be described in greater detail with reference to the figures.

Figure 1:
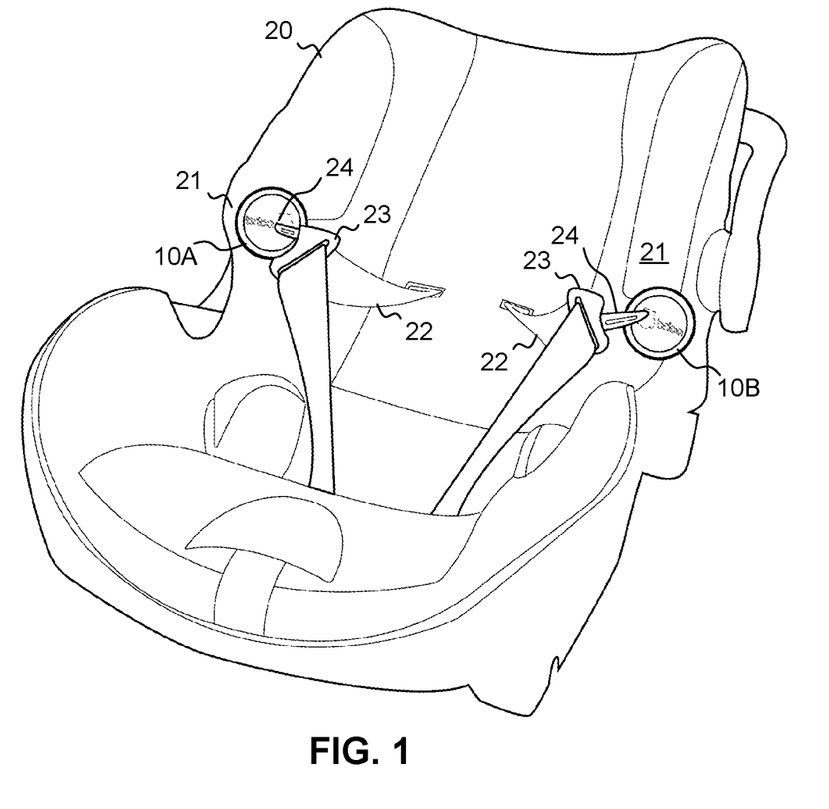
FIG. 1 illustrates a perspective view of left and right side vehicle harness clips attached to a car seat, according to an exemplary embodiment of the present subject disclosure.

FIG. 1 shows the use of the present subject disclosure with respect to a standard car seat or an infant car seat 20. Although a car seat is shown for sake of simplicity, the present subject disclosure may be used with any type of seating apparatus which has metallic harnesses or connectors used to secure a child, such as, for example, a high chair, lounge chair, or the like.

FIG. 1 shows a first harness retainer 10A and a second harness retainer 10B attached to the infant car seat 20. In use, the first harness retainer 10A and the second harness retainer 10B may be fastened to left and right arm portions 21 of the infant car seat 20 as shown. The infant safety straps 22 have a slideable and adjustable position buckle 23 with metallic buckle inserts 24. The metallic buckle inserts 24 may be magnetically secured to the first harness retainer 10A and the second harness retainer 10B in an "open position," e.g., before a child is placed into the car seat 20, or whenever the car seat 20 is unoccupied. The open position allows a child or infant to be conveniently positioned into the car seat 20 without the straps 22 getting in the way or the buckle 23 getting lost or buried underneath the child, as the child is placed into the car seat 20.

It should be noted that the first 10A and second 10B harness retainers are mirror images of each other, and have identical external and internal structures. Thus, the same label is used to point out equivalent structures in both harness retainers 10A and 10B. Alternatively, the first 10A and second 10B harness retainers may be completely identical. Further, reference label "10" is used to refer to both the left 10A and the right 10B harness retainers.

Figure 2:
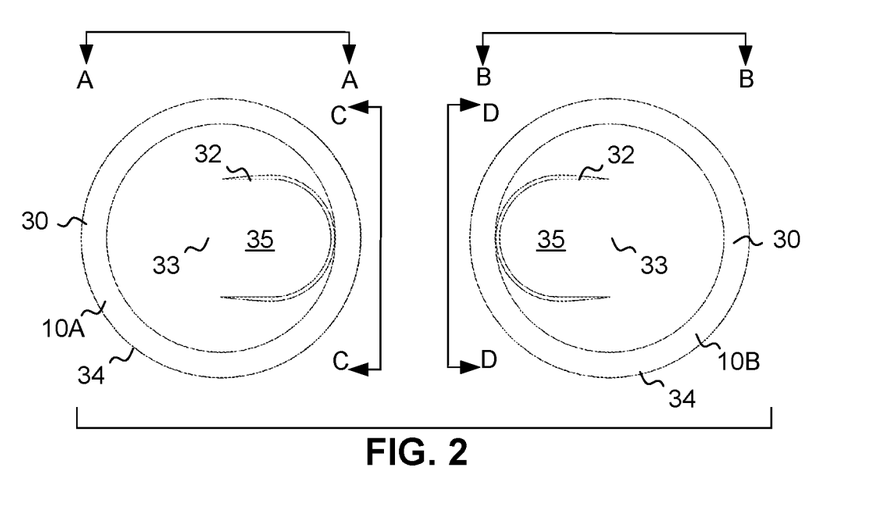
FIG. 2 illustrates a front view of the left and right side vehicle harness clips, according to an exemplary embodiment of the present subject disclosure.

FIG. 2 shows a top view of the left 10A and right 10B harness retainers. Each harness retainer 10A and 10B has a top cover 30, which may be in a circular configuration. A ledge 32 extends from about a center 33 of the top cover 30 of the harness retainer 10 to a peripheral edge 34 of the top cover 30. The ledge 32 is adapted to include a flat surface 35 onto which the metallic buckle insert 24 can be connected. The flat surface 35 maximizes the contact surface area that the metallic buckle insert 24 may interact with, as shown in FIG. 1, thereby creating a stronger magnetic secure attachment.

As shown in FIGS. 1 and 2, the flat surfaces 35 of the left 10A and right 10B harness retainers are positioned more toward the center of the car seat 20, to allow for closer proximity to the corresponding metallic inserts 24.

Figure 3:
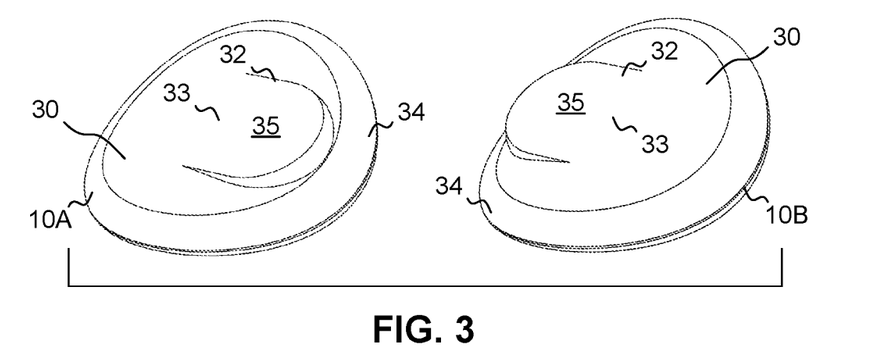
FIG. 3 illustrates an upper perspective view of the left and right side vehicle harness clips, according to an exemplary embodiment of the present subject disclosure.

FIG. 3 shows a front perspective view of the left 10A and right 10B harness retainers. The ledges 32 and flat surfaces 35 is more clearly depicted. The flat surface 35 attracts and retains the metallic inserts 24 of the buckles 23.

Figure 4:
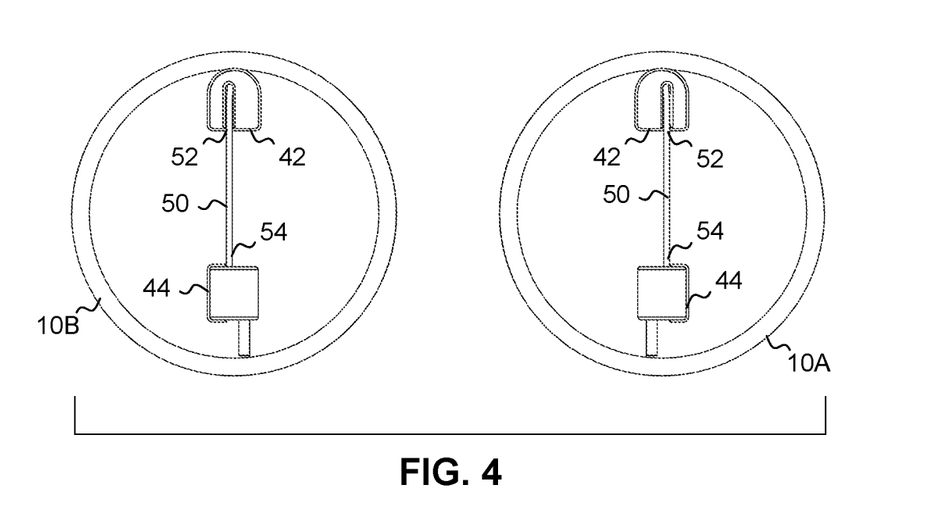
FIG. 4 illustrates a rear view of the left and right side vehicle harness clips, according to an exemplary embodiment of the present subject disclosure.

FIG. 4 shows a rear view of the first harness retainer 10A and the second harness retainer 10B. A fastener 50 is fixedly attached at a first end 52 to a first rear plate retainer 42. A second end 54 of the fastener 50 is removably attached to a second rear plate retainer 44. The fasteners 50 are both positioned away from the child and open in the away position to minimize the risk of injury if the fastener 50 is ever disengaged accidently or by the child.

Figure 5:
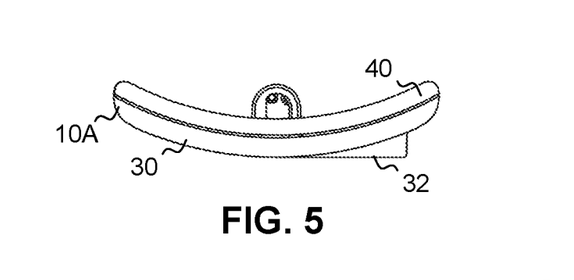
FIG. 5 is a top view of the left vehicle harness clip from the view shown at A-A in FIG. 2, according to an exemplary embodiment of the present subject disclosure.
Figure 6:
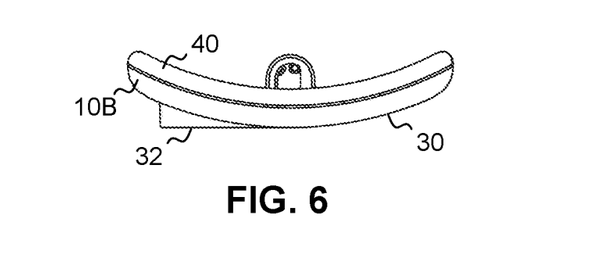
FIG. 6 is a top view of the right vehicle harness clip from the view shown at B-B in FIG. 2, according to an exemplary embodiment of the present subject disclosure.
Figure 7:
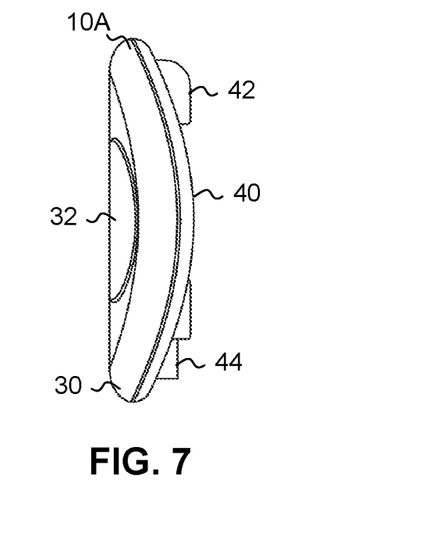
FIG. 7 is a side view of the left vehicle harness clip from the view shown at C-C in FIG. 2, according to an exemplary embodiment of the present subject disclosure.
Figure 8:
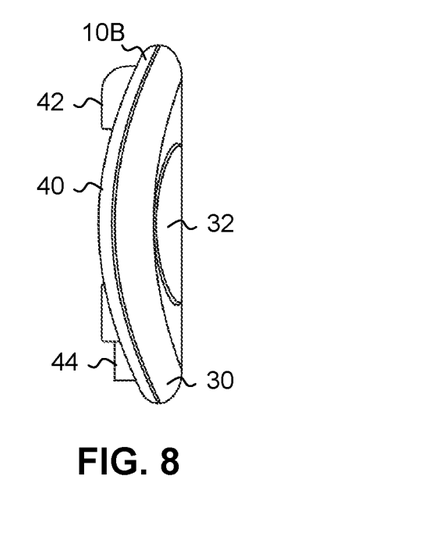
FIG. 8 is a side view of the right vehicle harness clip from the view shown at D-D in FIG. 2, according to an exemplary embodiment of the present subject disclosure.

FIGS. 5-8 illustrate the contoured shape of the harness retainer. FIGS. 5-6 are top views of the left and right vehicle harness clips 10A, 10B as shown from the views at A-A and B-B in FIG. 2, respectively. Likewise, FIGS. 7-8 depict side views of the left 10A and right 10B vehicle harness clips as shown at C-C and D-D in FIG. 2, respectively. As shown, the top cover 30 and a rear plate 40 are contoured with a curvature of radius to substantially match the curvature of an arm portion 21 of the car seat 20. In this manner, the vehicle harness clip 10 maintains a low profile, i.e., there is less of an obstruction and it lays closer to the curved arm portion 21 of the car seat 20.

Figure 9:
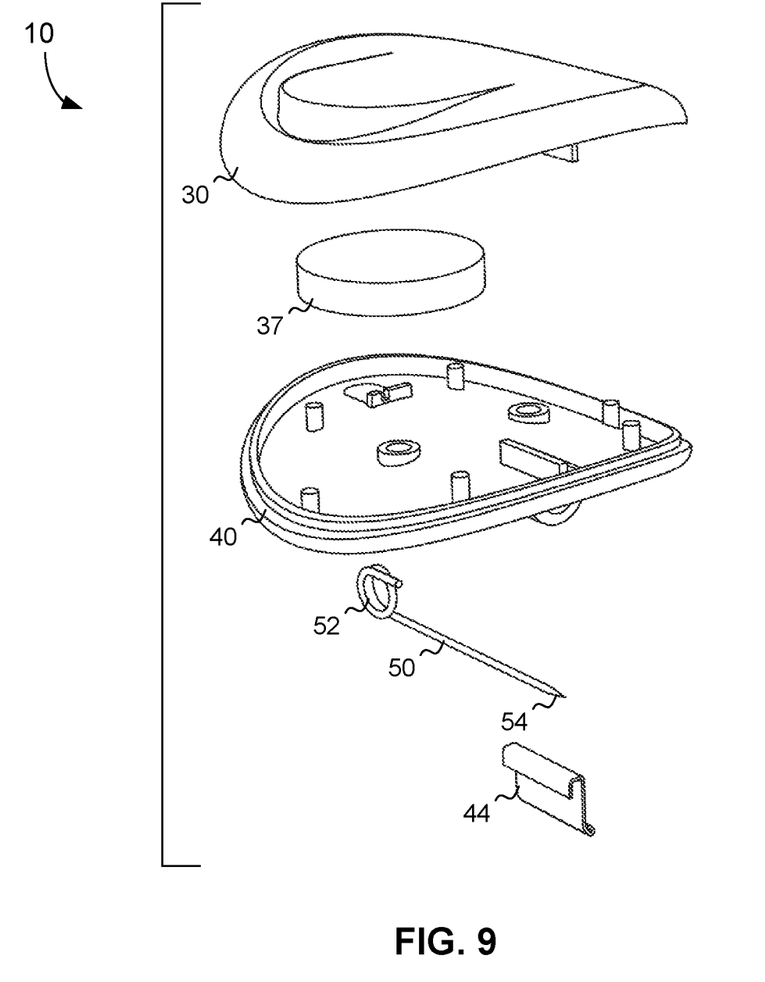
FIG. 9 is an exploded view of a vehicle harness clip, according to an exemplary embodiment of the present subject disclosure.
Figure 10:
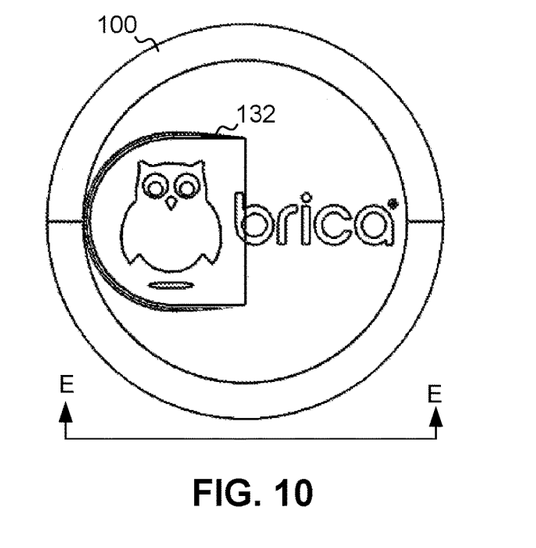
FIG. 10 illustrates a front view of a right side vehicle harness clip, according to a second exemplary embodiment of the present subject disclosure.

FIG. 9 shows an exploded perspective view of a harness retainer 10. The harness retainer 10 includes the top cover 30, a magnet 37, the rear plate 40, and the fastener 50. Further, there is a first rear plate retainer 42 (shown in FIG. 4) and a second rear plate retainer 44. In assembly, the magnet 37 is disposed between the cover 30 and the rear plate 40. The first rear plate retainer 42 and the second rear plate retainer 44 are fastened to the rear plate 40. The fastener 50 is fixedly attached to the first rear plate retainer 42 and removably attached to the second rear plate retainer 44.

The magnet 37 may be made from a highly magnetically attractive rare Earth material, such as Neodymium Iron Boron (NdFeB), sintered to form a permanent magnet, and/or any other material having strong magnetic attractive force properties in accordance with this subject disclosure. It is to be understood that various magnetically attractive magnets and/or material fasteners having attraction force properties may be used which are, now known or later discovered, in accordance with this invention.

Although the vehicle harness clips 10, 10A, 10B above are described with respect to a child car seat, it is to be understood that the harness clips may have a variety of other uses, such as with a back pack, a vehicle seat, or other device which may benefit from the attachment of a magnetic attractive element.

Figure 11:
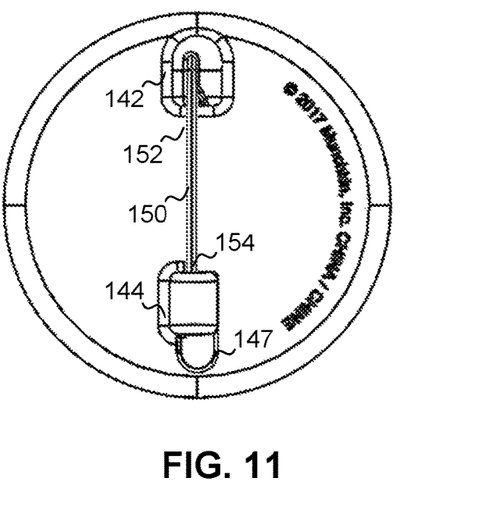
FIG. 11 illustrates a rear view of a right side vehicle harness clip, according to a second exemplary embodiment of the present subject disclosure.
Figure 12:
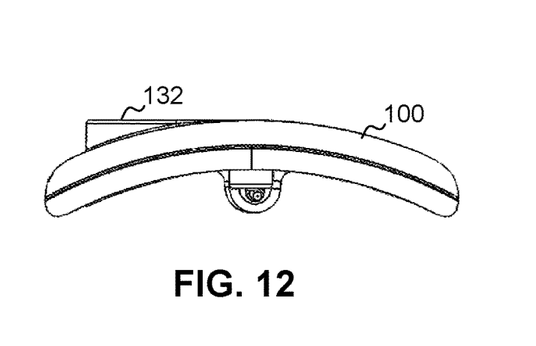
FIG. 12 is a bottom view of a right vehicle harness clip from the view shown at E-E in FIG. 10, according to a second exemplary embodiment of the present subject disclosure.
Figure 13A:
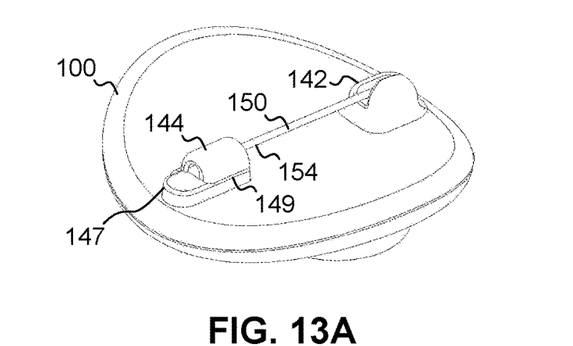
FIG. 13A illustrates a back perspective view of a right side vehicle harness clip with the release button disengaged, according to a second exemplary embodiment of the present subject disclosure.
Figure 13B:
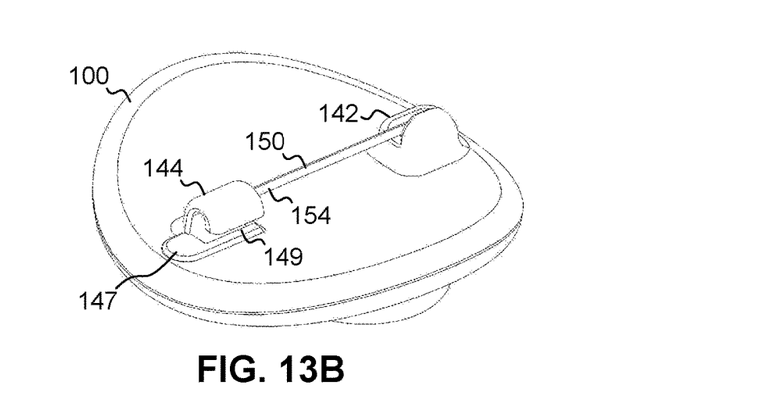
FIG. 13B illustrates a back perspective view of a right side vehicle harness clip with the release button pressed/engaged, according to a second exemplary embodiment of the present subject disclosure.
Figure 14:
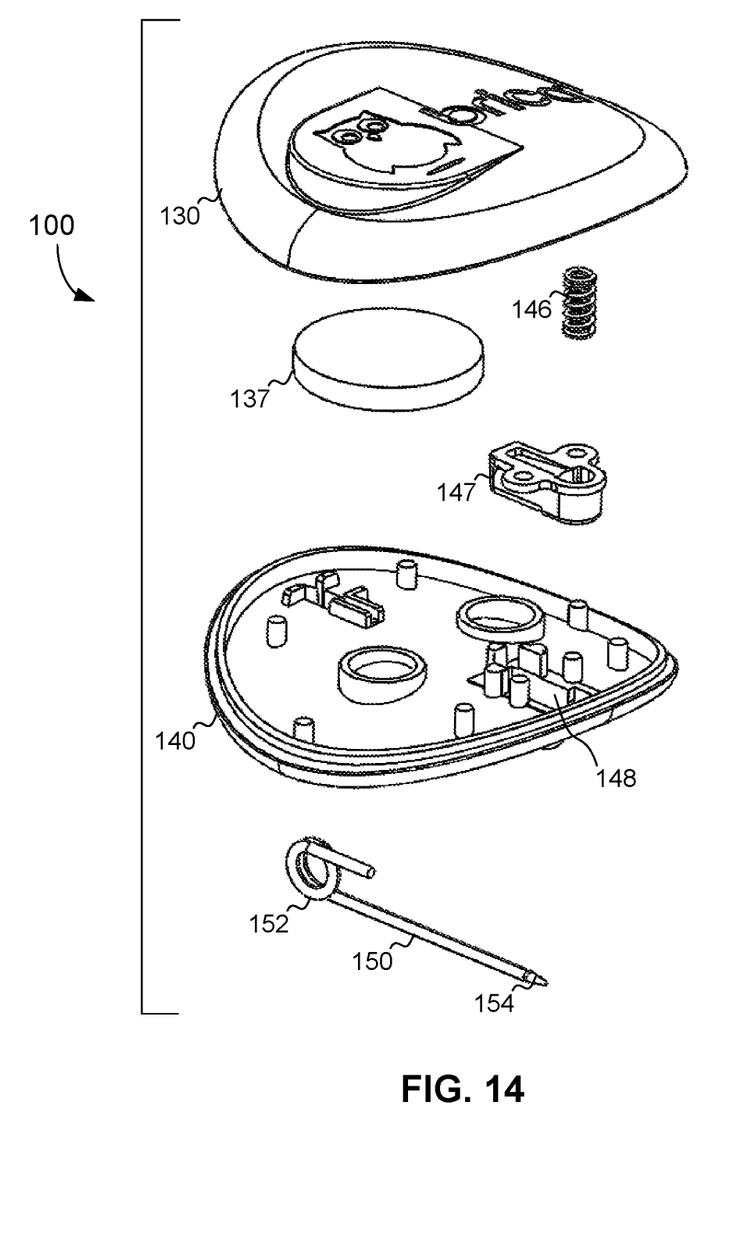
FIG. 14 is an exploded view of a vehicle harness clip, according to a second exemplary embodiment of the present subject disclosure.
Figure 15A:
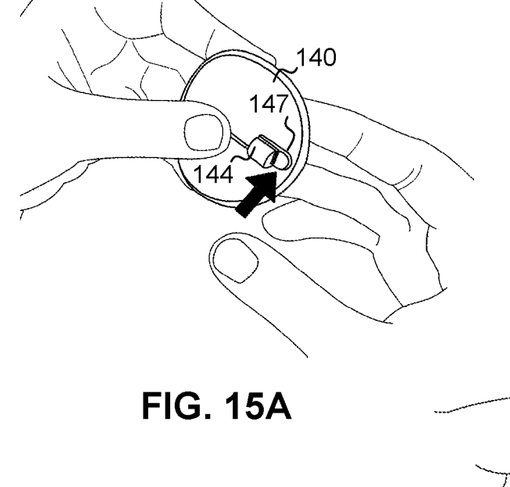
FIGS. 15A-15C illustrate an exemplary method of installing a harness clip onto a child seat, according to a second exemplary embodiment of the present subject disclosure.
Figure 15B:
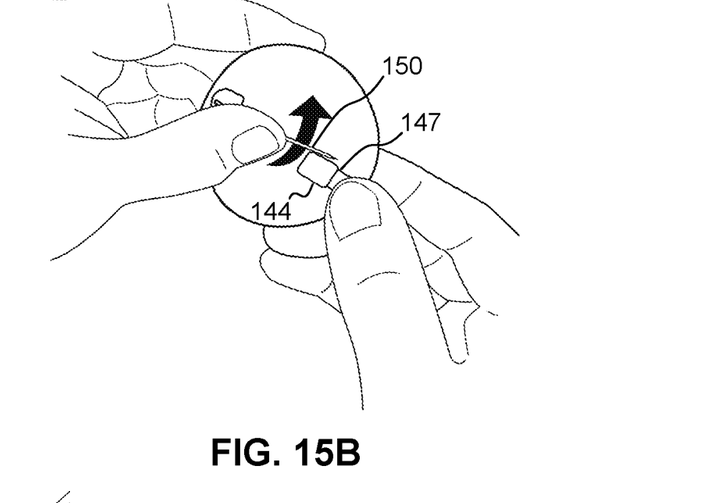
Figure 15C:
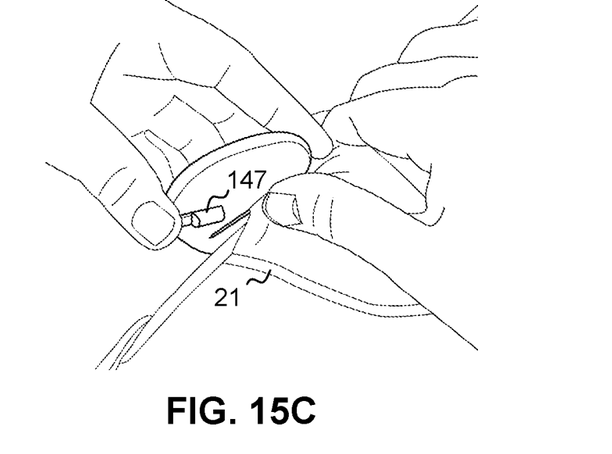

A second exemplary embodiment of a harness retainer 100 is shown in FIGS. 10-14, and shown in use in FIG. 15. As shown in top view in FIG. 10, harness retainer 100 is substantially similar to the harness retainer 10, shown in FIG. 2. FIG. 12 shows a bottom view of harness retainer 100 from the view E-E in FIG. 10. In both FIGS. 10 and 12, a ledge 132 is shown which is substantially similar to ledge 32 in the harness retainer 10 discussed previously.

However, harness retainer 100 has a different back configuration from harness retainer 10, as shown in FIGS. 11, 13, and 14. There is a first rear plate retainer 142 and a second rear plate retainer 144, which together support a fastener 150. The first rear plate retainer 142 is substantially similar to the first rear plate retainer shown with respect to harness retainer 10 discussed above. The second rear plate retainer 144 is designed differently as it interacts with a different internal mechanism than that described in the embodiments relating to harness retainer 10.

Referring to FIGS. 11, 13, and 14, the harness retainer 100 includes a cover 130, a magnet 137, a rear plate 140, and a fastener 150 having a first end 152 and a second end 154. The first end is fixed with respect to the first rear plate retainer 142. The second end 154 of the fastener 150 is moveable from a first position where it is secured within a chamber formed by the second rear plate retainer 144, and a second position where the second end 154 is released from the chamber formed by the second rear plate retainer 144. The second end 154 is released from its first position by depressing a release button 147 towards the rear plate 140 so that release button 147 moves further into release button chamber 148 and allows a slit 149 to be accessed by the second end 154 of the fastener 150. See FIG. 13B. The release button 147 is biased in the first position by an internal spring 146 which serves to allow the slit to be in the usual blocked position by release button 147.

FIGS. 15A-15C show a series of actions which allow the release of the fastener 150 from within the second rear plate retainer 144. In the step shown in FIG. 15A, the release button 147 is shown positioned substantially between the second rear plate retainer 144 and the rear plate 140. In the step shown in FIG. 15B, the release button 147 is depressed downward into the body of the rear plate 140 thereby opening the slit 149 (not shown) that allows the fastener to slip out from underneath the second rear plate retainer 144. FIG. 13B shows the position of the release button when it is pressed. This is facilitated by pushing the fastener 150 out of the slit 149 while the release button 147 is depressed. The fastener 150 is now released and can be used to secure the harness retainer 100 to the arm portion 21 of the car seat 20, as shown in FIG. 15C. Once the fastener 150 is pinned through the car seat arm portion 121, the release button 147 is again depressed to open up the slit 149 to allow the fastener 150 to slip back under the second rear plate retainer 144. The harness retainer 100 is now available for use.

As employed in this specification and annexed drawings, the term "or" is intended to mean an inclusive "or" rather than an exclusive "or." Moreover, articles "a" and "an" as used in the subject specification and annexed drawings should generally be construed to mean "one or more" unless specified otherwise or clear from context to be directed to a singular form.

What has been described above includes examples that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A harness retainer, comprising:
a cover having a ledge defining a flat surface;
a magnet;
a rear plate attached to the cover defining a contour having a radius of curvature, wherein the magnet is disposed under the ledge; the rear plate having a first retainer and a second retainer; and
a fastener fixedly attached to the first retainer and removably attached to the second retainer.

2. The harness retainer of claim 1, wherein the ledge extends from approximately a center of the cover outward to a peripheral edge of the cover.

3. The harness retainer of claim 1, wherein the ledge has a curved outer edge near a peripheral edge of the cover.

4. The harness retainer of claim 1, wherein the cover and the rear plate are both curved.

5. The harness retainer of claim 4, wherein the cover and the rear plate have parallel curved surfaces.

6. The harness retainer of claim 1, wherein the second retainer includes a slit large enough for the fastener to pass through.

7. The harness retainer of claim 6, further comprising a release button to release the fastener.

8. The harness retainer of claim 7, further comprising a spring which biases the release button in a position to block the slit.

9. The harness retainer of claim 8, wherein the spring is positioned between the cover and the rear plate.

10. The harness retainer of claim 7, wherein the release button is positioned within a release button chamber in the rear plate.

11. A harness retainer, comprising:
a curved cover having a ledge defining a flat surface;
a magnet;
a curved rear plate attached to the cover defining a contour having a radius of curvature, wherein the magnet is disposed under the ledge; the rear plate having a first retainer and a second retainer; and
a fastener fixedly attached to the first retainer and removably attached to the second retainer.

12. The harness retainer of claim 11, wherein the ledge extends from approximately a center of the cover outward to a peripheral edge of the cover.

13. The harness retainer of claim 11, wherein the cover and the rear plate have parallel curved surfaces.

14. The harness retainer of claim 11, wherein the second retainer includes a slit large enough for the fastener to pass through.

15. The harness retainer of claim 14, further comprising a release button to release the fastener.

16. The harness retainer of claim 15, further comprising a spring which biases the release button in a position to block the slit.

17. The harness retainer of claim 16, wherein the spring is positioned between the cover and the rear plate.

18. The harness retainer of claim 15, wherein the release button is positioned within a release button chamber in the rear plate.

19. A harness retainer, comprising:
a cover having a ledge defining a flat surface;
a magnet;
a rear plate attached to the cover, wherein the magnet is disposed under the ledge; the rear plate having a first retainer and a second retainer;
a fastener fixedly attached to the first retainer and removably attached to the second retainer; and
a release button to release the fastener, having a spring which biases the release button in a position to block a slit and allow the release button to be depressed into a cavity in the rear plate.

* * * * *